United States Patent
Harris

(10) Patent No.: US 9,603,338 B2
(45) Date of Patent: Mar. 28, 2017

(54) ANIMAL'S BOWL

(71) Applicant: William Harris, Oshawa (CA)

(72) Inventor: William Harris, Oshawa (CA)

(*) Notice: Subject to any disclaimer, the term of this patent is extended or adjusted under 35 U.S.C. 154(b) by 111 days.

(21) Appl. No.: 13/573,462

(22) Filed: Sep. 17, 2012

(65) Prior Publication Data

US 2015/0114302 A1    Apr. 30, 2015

(51) Int. Cl.
*A01K 5/01*    (2006.01)

(52) U.S. Cl.
CPC .............. *A01K 5/0114* (2013.01); *A01K 5/01* (2013.01); *A01K 5/0135* (2013.01)

(58) Field of Classification Search
CPC ....... A01K 5/01; A01K 5/0114; A01K 5/0135
USPC .............................. 119/61.5, 64.54
See application file for complete search history.

(56) References Cited

U.S. PATENT DOCUMENTS

| | | | | |
|---|---|---|---|---|
| 1,272,996 A | * | 7/1918 | Poschadel | A47G 19/02 220/575 |
| 1,562,620 A | * | 11/1925 | Dill | 119/61.1 |
| D168,283 S | * | 12/1952 | Adams | D7/555 |
| D229,074 S | * | 11/1973 | Cuprak | D30/130 |
| D321,572 S | * | 11/1991 | Laden | D30/129 |
| 5,542,565 A | * | 8/1996 | Hidalgo-Lopez | A47G 19/02 220/574 |
| D467,044 S | * | 12/2002 | Tangolics | D30/129 |
| 2008/0053374 A1 | * | 3/2008 | Kerrigan et al. | 119/51.03 |
| 2008/0141945 A1 | * | 6/2008 | Markham | 119/61.5 |
| 2009/0044755 A1 | * | 2/2009 | Volotzky | 119/61.54 |
| 2009/0126641 A1 | * | 5/2009 | Anderson et al. | 119/61.5 |
| 2011/0308470 A1 | * | 12/2011 | Vermeegen | 119/51.5 |
| 2013/0125823 A1 | * | 5/2013 | Simon et al. | 119/61.5 |

FOREIGN PATENT DOCUMENTS

| | | | | |
|---|---|---|---|---|
| DE | 3802989 A1 | * | 8/1989 | A01K 1/10 |
| EP | 1366657 A1 | * | 12/2003 | A01K 5/01 |
| JP | 2006211918 A | * | 8/2006 | |
| JP | 2012110313 A | * | 6/2012 | |
| WO | WO 03069985 A1 | * | 8/2003 | A01K 5/01 |

* cited by examiner

*Primary Examiner* — Son T Nguyen
(74) *Attorney, Agent, or Firm* — Barclay Damon, LLP

(57) ABSTRACT

The bowl is divided into lower and upper compartments. The side of the lower compartment is formed in part, by a lower portion of the side wall of the bowl and, in part, by a upwardly extending wall which extends upward from the bottom of the bowl and terminates at a platform of the upper compartment. Alternatively, the side of the lower compartment is formed entirely by an upwardly extending wall which extends upwardly from the bottom of the bowl and which is spaced apart from the side wall of the bowl. The upper portion of the side wall of the bowl forms the side of the upper compartment.

10 Claims, 4 Drawing Sheets

ANIMAL'S BOWL

This application claims priority pursuant to 35 U.S.C. 119 of Canadian application No. 2,752,872, filed Sep. 21, 2012, the entire contents of which are hereby incorporated by reference in their entirety.

FIELD OF THE INVENTION

This invention relates to bowls suitable for animal feed and more particularly to a bowl having lower and upper compartments in communication with each other.

BACKGROUND OF THE INVENTION

Many breeds of dogs have relatively flat faces composed of broad flat noses and flat foreheads, cheeks and chins. Boxers and bulldogs are examples of such breeds. Many tabbies and some breeds of cats also have similarly shaped faces. When such dogs or cats cat from a conventional bowl having a round or conical outer wall, they have difficulty in reaching feed at the edges at the bottom of the bowl because their cheeks or foreheads obstruct their mouths from reaching the feed. In order to reach the feed, the animal will frequently push against the side of the bowl and upset it. The feed will then be scattered about the floor surrounding the bowl I have found that if a bowl is composed of two compartments, a lower compartment located at least in part centrally of the bowl and an upper compartment surrounding the lower compartmnent, an animal having a relatively flat face or an animal having sore gums, missing or sore teeth and other medical problems with its mouth will have less difficulty in reaching feed at the bottom edge of the bowl. As the animal eats from the bowl, uneaten feed will settle in the lower compartment as the food above it is consumed. Provided the lower compartment is large enough to accommodate the animal's lower jaw, the animal can roll the food to a side wall of the lower compartment with its tongue where the animal can cat it without upsetting the bowl. Thus the bowl it easy for an animal to consume all of the feed in a bowl without upsetting it.

SUMMARY OF THE INVENTION

Briefly, the bowl of my invention has an interior defined by a cylindrical or conical side wall. The interior is divided into lower and upper compartments. The lower compartment is defined by a generally horizontal floor and an upstanding interior side wall which extends from the base to a platform of the upper compartment. The side of the latter compartment is defined by a upper portion of the side wall of the bowl.

DESCRIPTION OF THE DRAWINGS

The bowl of the invention is described with reference to the accompanying drawing in which.

Like reference characters refer to like parts throughout the description of the drawings.

DESCRIPTION OF PREFERRED EMBODIMENTS

In the following description, the subject bowl is described as a container for dog feed but the description is not intended to restrict its use as a container for such feed. The bowl in fact is suitable as a container for the feed of other animals including cats and rabbits.

Figure 1:
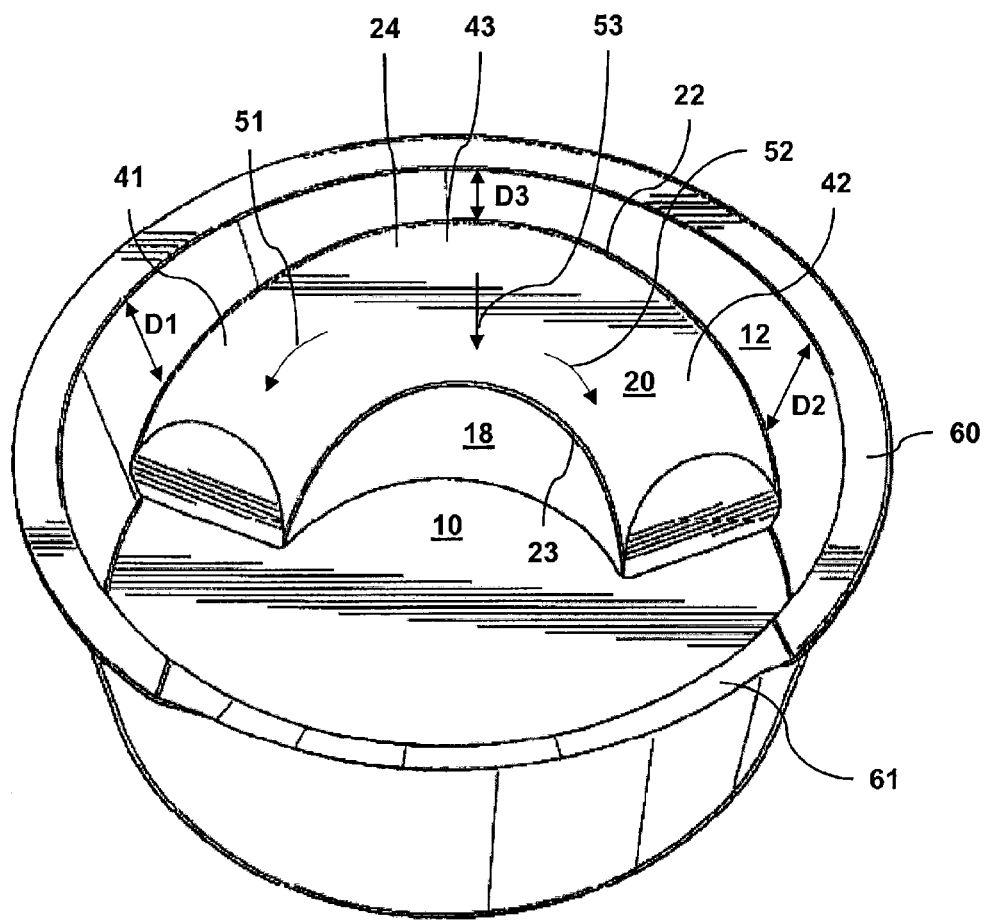
FIG. 1 is a perspective view of the bowl.
Figure 2:
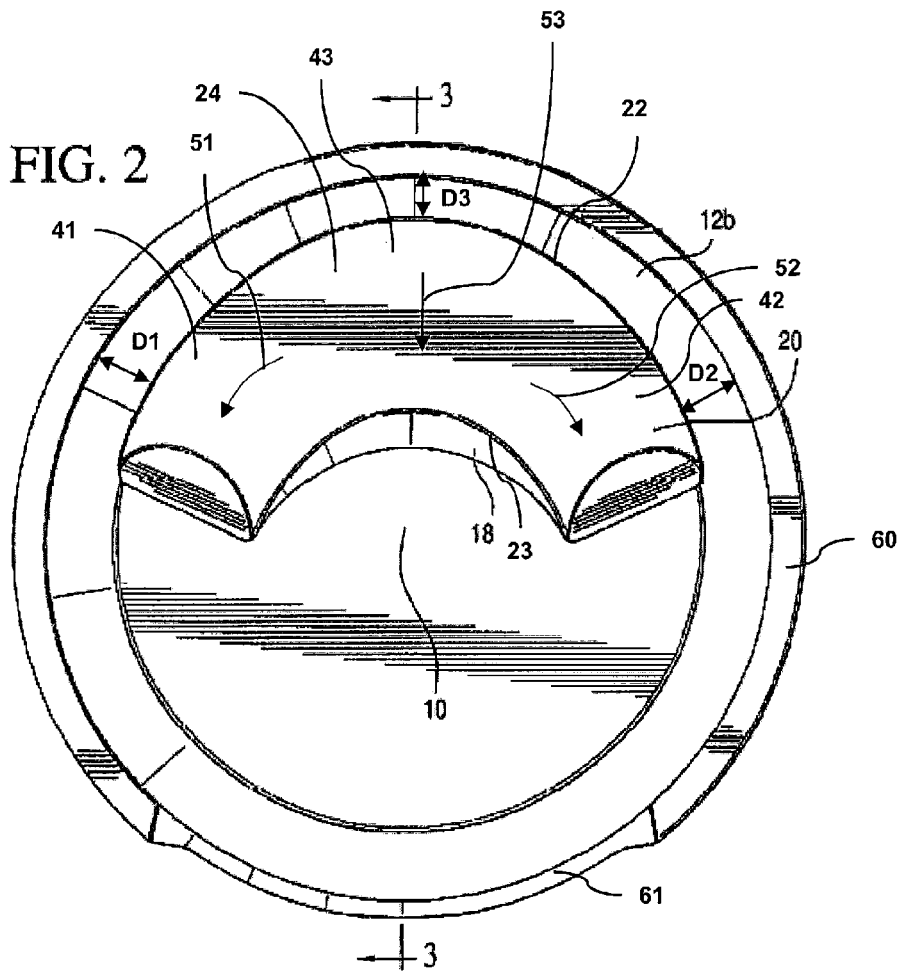
FIG. 2 is a plan view of the bowl.
Figure 3:
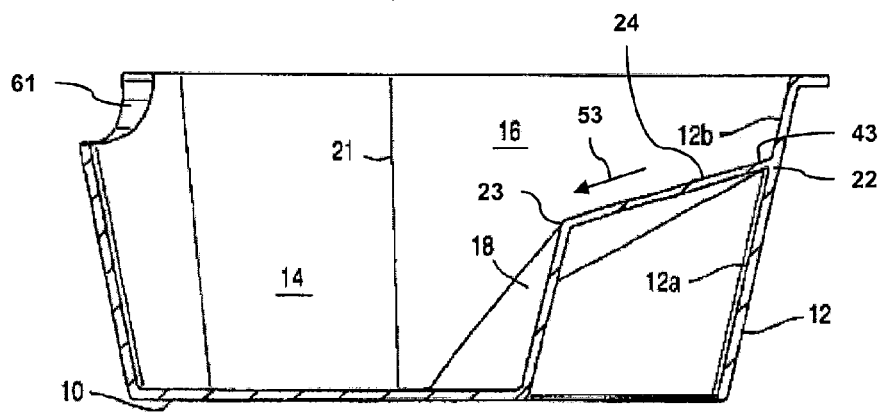
FIG. 3 is a section on line 3-3 of FIG. 2.

With reference to FIGS. 1-3, the subject bowl has a central vertical axis 21 (FIG. 3), a floor or base 10 that is a flat surface, a conical or cylindrical side wall 12 which increases in circumference upwardly of the floor or base 10 as it extends from the floor 10 to an upper rim 60 about the central vertical axis 21 to define an interior of the bowl. and a platform 20 positioned above the floor 10. The platform 20 includes a top surface 24 intersecting the side wall at an outer edge 22 of the platform 20. The interior of the bowl consists of a lower compartment or space 14 and an upper compartment or space 16. The lower compartment 14 extends below the top surface 24 of the platform 20 is defined at its bottom by floor 10 and at its sides, in part, by a lower portion 12a of the side wall 12 of the bowl and in part by an upwardly extending wall 18. As can be seen in FIG. 3, the central vertical axis 21 intersects the floor 10 in the lower compartment 14 of the interior of the bowl. The upwardly extending wall 18 is generally U-shaped and extends outwardly from the floor 10 and terminates at the inner edge 22 of the platform 20 of the upper compartment 16. It too is U-shaped.

The upper compartment 16 extends above the top surface 24 of the platform 20 and is defined at its bottom by the top surface 24 of the platform 20 and at its sides by the upper portion 12b of the side wall 12 of the bowl. The platform 20 includes a first end section 41, a second end section 42 opposite of the first end section, and a middle section 43 between the first end section 41 and the second end section 42. The first end section of the platform and the second end section of the platform intersect the floor. The top surface 24 of the platform 20 slopes downwardly in a first direction 51 from the middle section 43 of the platform 20 to the first end section 41 of the platform 20 toward the floor 10. The top surface 24 of the platform 20 slopes downwardly in a second direction 52 from the middle section 43 of the platform 20 to the second end section 42 of the platform 20 toward the floor 10. The top surface 24 of the platform 20 slopes downwardly in a third direction 53 from the outer edge 22 of the platform 20 to an inner edge 23 of the platform 20 toward the central vertical axis 21 of the bowl. As can be seen in FIGS. 1 and 2, the distance D3 between the upper rim 60 and the intersection of the top surface 24 of the platform 20 and the side wall 12 at the middle section 43 of the platform 20 is less than the distance D1 between the upper rim 60 and the intersection of the top surface 24 of the platform 20 and the side wall 12 at the first end section 41, and the distance D2 between the upper rim 60 the intersection of and the top surface 24 of the platform 20 and the side wall 12 at the second end section 42. The sloping directions 51, 52, 53 of the top surface 24 of the platform 20 are configured so that particulate dog food such as kibble or gravy and pieces of meat in the gravy flow toward the centre of the bowl and into the lower compartment 14. The upwardly extending wall 18 may be vertical or preferably is sloped gradually inward as its extends downward from the inner edge 23 of the platform 20 to the floor 10 toward the central vertical axis 21 so that the dog food will flow downward to the floor 10 of the lower compartment 14. The upper rim 60 includes a recess 61 that is positioned radially opposite of the platform 20.

Figure 4:
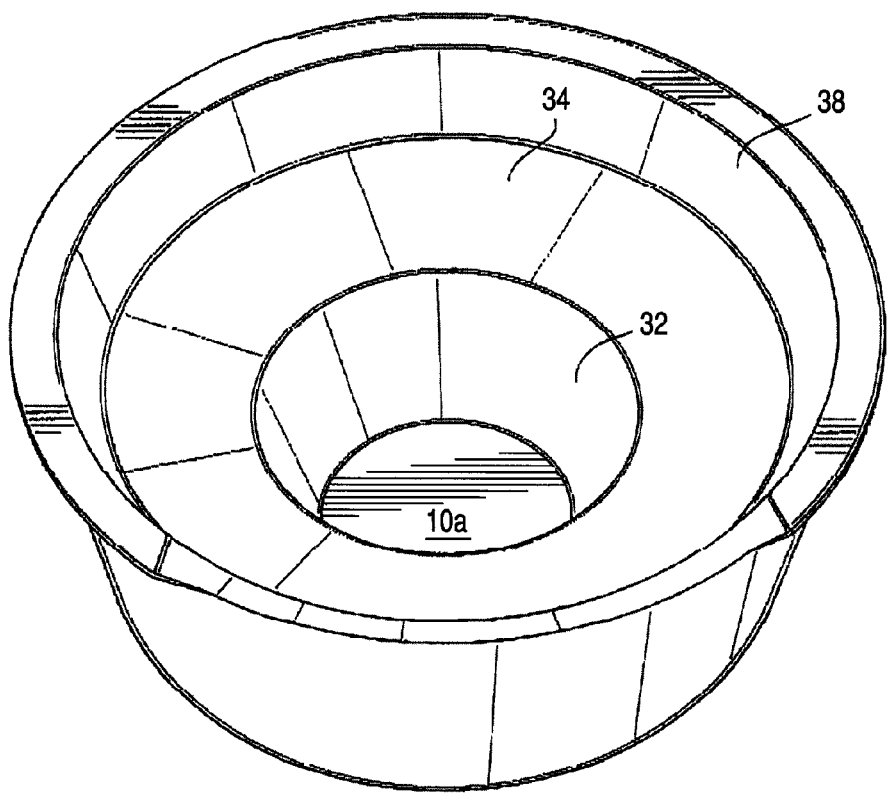
FIG. 4 is a perspective view of a second embodiment of the bowl of the invention.
Figure 5:
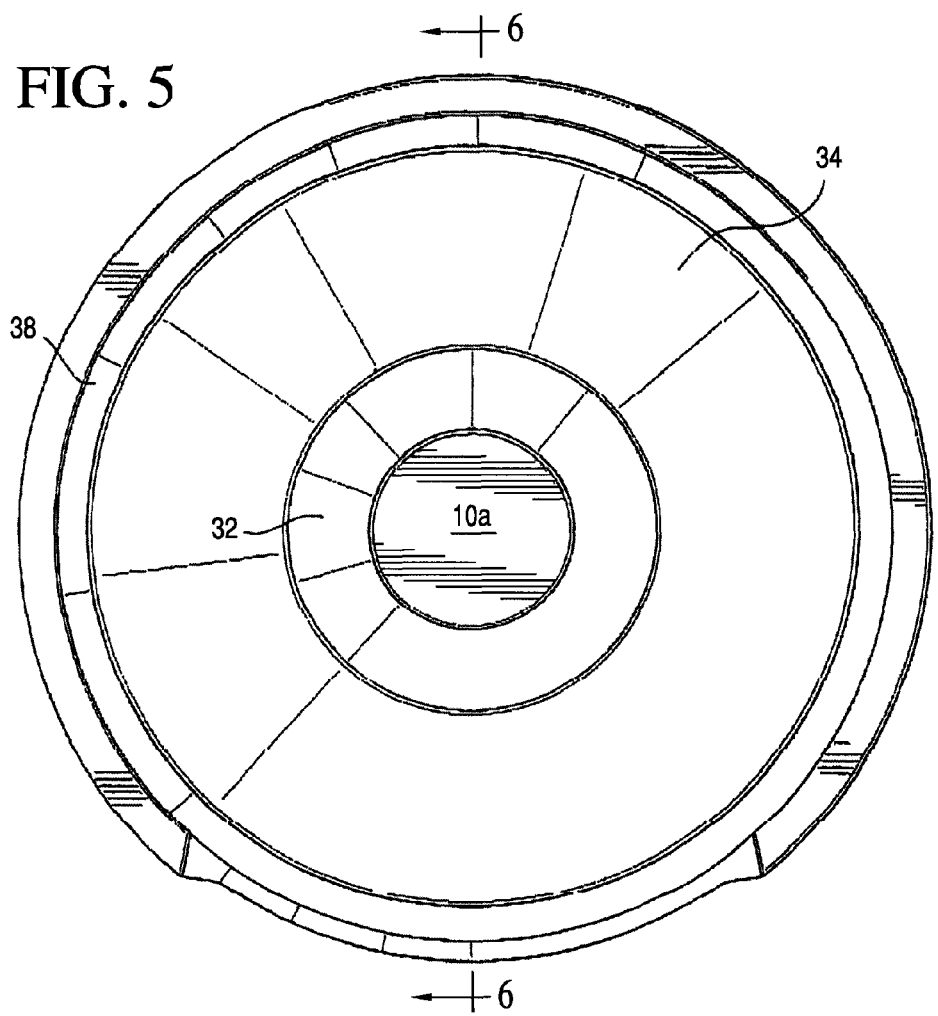
FIG. 5 is a plan view of the bowl of FIG. 4.
Figure 6:
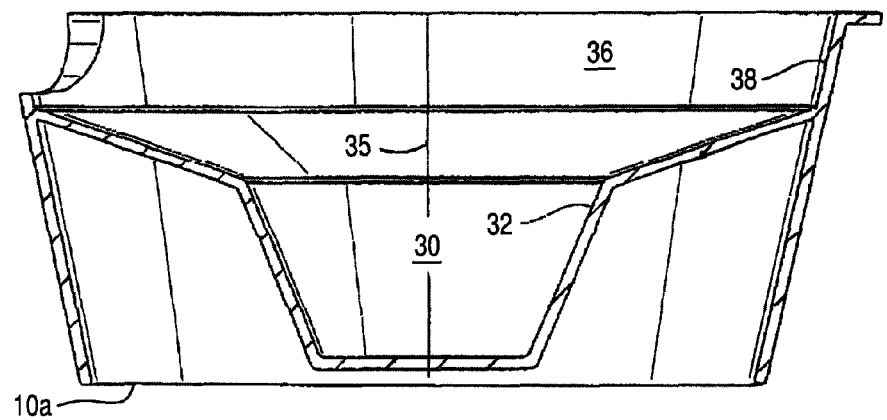
FIG. 6 is a section on line 6-6 of FIG. 5.

In FIG. 4-6, the bowl is conical in shape and its lower compartment 30 is defined by a floor 10a, a annular upwardly extending wall 32 which is curved through its extent and which extends upward to an annular platform 34 of an upper compartment 36. The lower compartment is preferably located centrally in the bowl and no part of it extends to the side wall 38 of the bowl.

Like the platform and upwardly extending wall of the first embodiment illustrated in FIGS. 1-3, platform 34 and upwardly extending wall 32 are sloped downward toward the central vertical axis 35 of the bowl so that dog food on the platform and wall 32 will flow toward the centre of the bowl and into the lower compartment of the bowl.

The dimensions of the lower and upper compartments will depend upon the size of the dog which will be eating out of the bowl. The dimensions should be such that the lower compartment accommodates at least the lower jaw of the dog and accordingly, a large dog will require a larger lower compartment than a smaller dog.

It will be understood, of course that modifications can be made to the structure of the bowl without departing from the scope and purview of the invention as defined in the appended claims.

I claim:

1. A bowl suitable for animal feed, the bowl comprising:
a central vertical axis;
a floor;
an upper rim;
a side wall extending from the floor to the upper rim about the central vertical axis to define an interior of the bowl, the interior of the bowl including an upper compartment and a lower compartment;
a platform positioned above the floor, the platform comprising
a first end section, a second end section opposite of the first end section, and a middle section between the first end section and the second end section, and
a top surface intersecting the side wall at an outer edge of the platform; the top surface sloping downwardly in a first direction from the middle section of the platform to the first end section of the platform toward the floor, sloping downwardly in a second direction from the middle section of the platform to the second end section of the platform toward the floor, and sloping downwardly in a third direction from the outer edge of the platform to an inner edge of the platform toward central vertical axis; and
an upwardly extending wall extending from the floor to the inner edge of the platform,
wherein a distance between the upper rim and the intersection of the top surface of the platform and the side wall at the middle section of the platform is less than (i) a distance between the upper rim and the intersection of the top surface of the platform and the side wall at the first end section, and (ii) a distance between the upper rim and the intersection of the top surface of the platform and the side wall at the second end section.

2. The bowl of claim 1, wherein the lower compartment of the interior of the bowl extends below the top surface of the platform and is defined on its bottom by the floor and on its sides by a lower portion of the side wall and the upwardly extending wall, and the upper compartment of the interior of the bowl extends above the top surface of the platform and is defined on its bottom by the top surface of the platform and on its sides by an upper portion of the side wall.

3. The bowl of claim 2, wherein the central vertical axis intersects the floor in the lower compartment of the interior of the bowl.

4. The bowl of claim 1, wherein the floor is a flat surface.

5. The bowl of claim 1, wherein the first end section of the platform and the second end section of the platform intersect the floor.

6. The bowl of claim 1, wherein the upwardly extending wall slopes downwardly from the inner edge of the platform to the floor toward the central vertical axis.

7. The bowl of claim 6, wherein the upwardly extending wall is U-shaped.

8. The bowl of claim 1, wherein the side wall is conical or cylindrical.

9. The bowl of claim 1, wherein the upper rim comprises a recess.

10. The bowl of claim 9, wherein the recess is positioned radially opposite of the platform.

* * * * *